US012736942B2

(12) United States Patent
Oberste-Ufer et al.

(10) Patent No.: US 12,736,942 B2
(45) Date of Patent: Sep. 15, 2026

(54) METHOD FOR PREPARING FOR THE START-UP OF A CONTROL UNIT FOR ACCESS DEVICES, ACCESS SYSTEM, CONTROL UNIT, ACCESS DEVICE, COMPUTER PROGRAM PRODUCT

(71) Applicants: DORMAKABA DEUTSCHLAND GMBH, Ennepetal (DE); DORMAKABA INTERNATIONAL HOLDING GMBH, Ennepetal (DE); DORMAKABA SCHWEIZ AG, Rümlang (CH); DORMAKABA EAD GMBH, Villingen-Schwennigen (DE); DORMAKABA ESPAÑA S.A.U., Madrid (ES)

(72) Inventors: Kai Oberste-Ufer, Ennepetal (DE); Christian Rappel, Wetzikon (CH); Thomas Vogler, Ennepetal (DE); Sven Busch, Ennepetal (DE); Ingo Halder, Ennepetal (DE); Bernd Gehrmann, Ennepetal (DE); Andrzej Dudzinski, Ennepetal (DE); Chandra Prakash Gupta, Ennepetal (DE); Oliver Borchmann, Ennepetal (DE); Frank Lorenz, Rümlang (CH); Martin Wolf, Bonn (DE); Alexander Bradfisch, Ennepetal (DE); Stephan Giernich, Bonn (DE); Pedro Guerra, Madrid (ES)

(73) Assignees: DORMAKABA DEUTSCHLAND GMBH, Ennepetal (DE); DORMAKABA INTERNATIONAL HOLDING GMBH, Ennepetal (DE); DORMAKABA SCHWEIZ AG, Rumlang (CH); DORMAKABA EAD GMBH, Villingen-Schwennigen (DE); DORMAKABA ESPAÑA S.A.U., Madrid (ES)

( * ) Notice: Subject to any disclaimer, the term of this patent is extended or adjusted under 35 U.S.C. 154(b) by 28 days.

(21) Appl. No.: 18/547,287

(22) PCT Filed: Aug. 19, 2021

(86) PCT No.: PCT/EP2021/073070
§ 371 (c)(1),
(2) Date: Aug. 21, 2023

(87) PCT Pub. No.: WO2022/179717
PCT Pub. Date: Sep. 1, 2022

(65) Prior Publication Data

US 2024/0153328 A1 May 9, 2024

(30) Foreign Application Priority Data

Feb. 24, 2021 (EP) .................................... 21382158

(51) Int. Cl.
*G07C 3/00* (2006.01)
*G05B 19/406* (2006.01)
(Continued)

(52) U.S. Cl.
CPC ............ *G05B 19/406* (2013.01); *G06F 8/61* (2013.01); *G07C 9/00817* (2013.01);
(Continued)

(58) Field of Classification Search
CPC .................. G06F 8/61; G07C 9/00817; G07C 2009/00841
See application file for complete search history.

(56) References Cited

U.S. PATENT DOCUMENTS

2016/0364927 A1* 12/2016 Barry ..................... G08B 25/10
2017/0236354 A1* 8/2017 Baker .................. H04W 12/08 340/5.71

(Continued)

FOREIGN PATENT DOCUMENTS

CN 105981352 A 9/2016
EP 3349185 A1 7/2018

OTHER PUBLICATIONS

International Search Report for International Application No. PCT/EP2021/073070, dated Feb. 1, 2022, 4 pages translated.

(Continued)

*Primary Examiner* — Nabil H Syed
(74) *Attorney, Agent, or Firm* — CANTOR COLBURN LLP

(57) ABSTRACT

A method for preparing for the start-up of a control unit for access devices, wherein at least one access device is communicatively connected to the control unit, wherein the control unit has a communication interface for information technology communication with a mobile terminal and/or has an input device for detecting an input from an installer or is in communicative connection with an input device for detecting an input from an installer.

The method includes a) detecting, using the control unit, an information technology signal or a change in an existing information technology continuous signal of a mobile terminal by the communication interface, and/or detecting an input from an installer using the input device, (Continued)

b) sending a trigger signal from the control unit to the access device,
c) receiving the trigger signal using the access device, and
d) performing an action using the access device depending on the received trigger signal.

13 Claims, 8 Drawing Sheets

(51) Int. Cl.
*G06F 8/61* (2018.01)
*G07C 9/00* (2020.01)

(52) U.S. Cl.
CPC .............. *G05B 2219/33297* (2013.01); *G07C 2009/00825* (2013.01); *G07C 2009/00841* (2013.01)

(56) References Cited

U.S. PATENT DOCUMENTS

2018/0075731 A1* 3/2018 Frenette ................ G06F 3/0484
2020/0082652 A1 3/2020 Farber et al.

OTHER PUBLICATIONS

Written Opinion for International Application No. PCT/EP2021/073070, dated Feb. 1, 2022, 6 pages translated.
Chinese Office Action for Application No. 202180094285.8, dated Mar. 14, 2026, 20 pages with translation.
Singapore Office Action for Application No. 11202306072Q, dated Mar. 13, 2026, 8 pages.

* cited by examiner

20
Mobile terminal
S
11
K
Control unit
111
113
Access device
Access device
Access device
112
S
12
Control unit
130
121
123
Access device
Access device
Server
Digital representation
111'
Access device
122
Association information
Configuration data
112'
113'
121'
122'
123'

METHOD FOR PREPARING FOR THE START-UP OF A CONTROL UNIT FOR ACCESS DEVICES, ACCESS SYSTEM, CONTROL UNIT, ACCESS DEVICE, COMPUTER PROGRAM PRODUCT

CROSS-REFERENCE TO RELATED APPLICATIONS

This application is a 35 U.S.C. § 371 National Stage patent application of PCT/EP2021/073070, filed on 19 Aug. 2021, which claims the benefit of European patent application 21382158.0, filed on 24 Feb. 2021, the disclosures of which are incorporated herein by reference in their entirety.

TECHNICAL FIELD

The present disclosure relates to a method for preparing for the start-up of a control unit for access devices, wherein at least one access device is communicatively connected to the control unit. The disclosure further relates to an access system with at least one access device and at least one control unit. Furthermore, the disclosure relates to a corresponding control unit, an access device and a computer program product.

BACKGROUND

When planning buildings and access solutions for buildings or areas, plans are created that show which access devices are planned for which location in the building. Modem access solutions often comprise a wide range of functions that require electrical control, such as automatic door devices, security functions, alarm functions and lock functions. Electrical control units are therefore planned and installed to control the access devices.

In practice, the access devices and the control units are installed on the basis of the plans drawn up, wherein the intended device types are arranged and installed at the intended locations in the building. It is typically not known exactly which control unit was installed at which point in the building and to which access devices an installed control unit was connected. The later start-up of the control units and access devices as well as their functional configuration, in particular with the help of suitable software, is therefore typically cumbersome as well as time-consuming and costly. The start-up of the access devices and the control units is often performed with a time lag after they have been arranged and installed in the building and often by the company's own specialist staff.

SUMMARY

Against this background, the disclosure provides an advantageous method for preparing for the start-up of a control unit for access devices, in which case technical malfunctions and incorrect configurations can preferably be reduced and/or costs and/or time can be saved.

The advantage is achieved by providing a method for preparing for the start-up of a control unit for access devices, wherein at least one access device is communicatively connected to the control unit, wherein the control unit has a communication interface for information technology communication with a mobile terminal and/or has an input device for detecting an input from an installer or is in communicative connection with an input device for detecting an input from an installer, wherein the method comprises the following steps:

a) detecting, using the control unit, an information technology signal or a change in an existing information technology continuous signal of a mobile terminal by means of the communication interface, and/or detecting an input from an installer using the input device, b) sending a trigger signal from the control unit to the access device connected to the control unit, c) receiving the trigger signal using the access device, d) performing an:=action using the access device depending on the received trigger signal.

With the help of the present disclosure it can be achieved in an efficient manner that, for the start-up of the access devices and control units and their functions, it is known precisely which control unit has been connected to which access devices. Thus, in particular, an efficient configuration of the control unit and/or the access devices can take place according to the functions planned for these access devices. Using the method according to the disclosure, it can be determined in particular where which control unit was arranged or installed in a building. The present disclosure can reduce the amount of time and money involved in the start-up of a control unit for access devices. Furthermore, it is possible according to the disclosure to identify a faulty arrangement of a control unit in a building at an early stage and to avoid incorrect configurations of control units and access devices.

An action is preferably performed by the access device as a function of the trigger signal received in step d) in response to the trigger signal received by the access device in step c).

According to one embodiment of the present disclosure, the action performed by the access device in step d) is preferably an action perceptible to an installer, for example opening and/or closing a door or a signal output from a signal output device.

According to one embodiment of the present disclosure, the trigger signal is sent in step b) from the control unit to the access device connected to the control unit depending in particular on:

- the information technology signal detected by the control unit in step a) or
- the change in the existing continuous information technology signal detected by the control unit in step a) or
- the input of an installer detected in step a) using the input device.

The method according to the disclosure is in particular a computer-implemented method in which one, several or all steps of the method are performed in a computer-implemented manner.

Advantageous developments and designs of the present disclosure can be found in the dependent claims.

According to one embodiment of the present disclosure, it is provided that the mobile terminal has a communication interface for information technology communication with the control unit, wherein in step a) a transmission by the mobile terminal, the information technology signal or a change in the existing continuous information technology signal of the mobile terminal takes place using the communication interface of the mobile terminal.

According to one embodiment of the present disclosure, it is provided that each access device comprises at least one access component, wherein the action is performed by an access component of an access device in step d). According to one embodiment of the present disclosure, the fact that an access device comprises an access component can be understood to mean that the access component is connected to the access device and/or is part of the access device. It is conceivable that the access components of an access device comprise one, several or all of the following access components:

- a door element and/or a separating element,
- a hinge,
- a fire protection element,
- a lock, in particular an electric lock,
- an opening and/or closing device for a door element, in particular comprising an actuator and/or motor,
- a person control and/or identity control unit, in particular a reader for a passport,
- an access control unit, in particular a code or password control,
- a biometric sensor,
- an optical sensor,
- an acoustic sensor,
- an electrical power and/or voltage supply,
- a display device,
- a light source,
- an acoustic output device,
- a warning and/or safety device.

According to one embodiment of the present disclosure, it is provided that the signal or continuous signal detected using the communication interface of the control unit in step a) is a short-range communication signal, preferably a Bluetooth signal or continuous Bluetooth signal, a low-energy Bluetooth signal, a ZigBee signal or a Wi-Fi signal. It is thus advantageously possible for the signal or continuous signal detected in step a) to be transmitted by the mobile terminal using wireless communication technology and preferably at least in the vicinity of the terminal can be received by the control unit. The signal or continuous signal detected in step a) relates, for example, to a pairing, in particular a Bluetooth pairing, of the mobile terminal and the control unit or advertising of the mobile terminal or trigger information sent by the mobile terminal.

According to one embodiment of the present disclosure, it is provided that the control unit, in particular

- depending on the detection of the information technology signal or the detection of the change in the existing continuous information technology signal of the mobile terminal instep a), and/or
- depending on the detection of the input of the installer using the input device in step a), sends a signal to the mobile device from which the identity of the control unit can be derived. In this case, the control unit preferably transmits identification information, for example a serial number and/or UUID (universally unique identifier), of the control unit to the mobile terminal. The identity of the control unit that performs the detection in step a) is thus known to the mobile terminal, and an efficient assignment can be made between the identity of this control unit and the access device that performs step d).

According to one embodiment of the present disclosure, it is provided that the installer makes an input into the mobile terminal, wherein the input comprises information about

- which control unit detects or has detected an information technology signal or a change in an existing continuous information technology signal in step a) or at the input device from which control device an input is performed or has been performed in step a) by the installer, and/or
- which access device is performing or has performed the action in step d). It is conceivable that the information about which access device is performing or has performed the action in step d) has information about which access component of the access device has performed the action in step d). In particular, it is conceivable that by inputting identification information,
- relating to the access device that is performing or has performed the action in step d), and/or
- relating to the control unit that is performing or has performed the detection in step a), can be derived or is input. In this way, an advantageous identification and assignment can take place.

According to one embodiment of the present disclosure, it is provided that the action performed by the access device in step d) is a target function of the access device and/or a target function of an access component of the access device. The target function is, for example, one or more of the following actions:

- performing an opening and/or closing movement of a door,
- locking and/or unlocking a lock,
- representing display information on a display device. In particular, a function of the access component or of the access device can be understood as a target function, for the implementation of which this access component or access device is designed in normal operation. Such a target function can be perceived in particular by an installer, so that the installer can identify which access component or access device is performing its target function in step d). As a result, the access component or access device that performs the target function in step d) can be identified by the installer, for example by the installer reading or photographing identification information attached to the access component or access device or reading it in using the mobile terminal.

According to one embodiment of the present disclosure, it is provided that the action performed by the access device in step d) comprises that the access device transmits a perceptible signal by means of a signal output device of the access device. The perceptible signal transmitted by the access device can preferably be perceptible by an installer. As a result, the access component or access device that performs step d) can be identified for the installer, for example by the installer reading or photographing identification information attached to the access component or access device or reading it in using the mobile terminal. The perceptible signal transmitted by the access device is preferably an optical signal and/or an acoustic signal. For example, the perceptual signal transmitted may be one or more of the following signals:

- visual signal from a light on the access device, in particular a flashing light,
- optical signal from a warning and/or safety device of the access device,
- acoustic signal from an acoustic output device of the access device,
- acoustic signal from a warning and/or safety device of the access device.

According to one embodiment of the present disclosure, it is provided that the action performed by the access device in step d) comprises that an information technology signal is transmitted by the access device or an existing continuous information technology signal of the access device is changed. In this case, the access device preferably has a communication interface for sending out the information technology signal and/or for changing the continuous information technology signal. It is conceivable that with the aid of the signal and/or continuous signal from the access device in step d), identification information, e.g., a serial number and/or UUID (universally unique identifier), is transmitted to the access device by the access device.

According to one embodiment of the present disclosure, it is provided that the method comprises:

e) detecting the transmitted information technology signal of the access device or detecting the change in the existing continuous information technology signal of the access device using the mobile terminal. It is particularly conceivable that the mobile terminal is configured to receive the continuous signal from the access device in a device search mode of the mobile terminal.

According to one embodiment of the present disclosure, it is provided that, depending on the signal detected in step e) or the change in the existing continuous signal detected in step e), information is obtained or derived about which access device transmitted the information technology signal in step d) or the continuous information technology signal of which access device was changed in step e): This enables an advantageous identification of the access device that is connected to the control unit that performs the detection in step a).

According to one embodiment of the present disclosure, it is provided that the control unit identification information of the access device or access component to which the trigger signal was sent in step b) and/or which performed the action in step d) to the mobile terminal, in particular using the communication interface of the control unit. It is thus advantageously possible for the identity of the access device or the access component, which is connected to the control unit, to be communicated to the mobile terminal by the control unit. According to this embodiment, it is preferably conceivable that the action that is performed in step d) by the access device or its access component comprises that identification information for the access device or access component is sent from the access device or access component to the control unit, in particular via a connection between the control unit and the access device or the access component. In this case, it is conceivable in a particularly advantageous manner that the access device or access component does not have to have its own communication interface for sending out an information technology signal or continuous signal. This can save costs.

According to one embodiment of the present disclosure, it is provided that the mobile terminal communicates with a server via a direct or indirect network connection, wherein the server has a digital representation of the access devices, wherein the digital representation comprises association information from which it can be derived which of the access devices are assigned together to a common control unit and are or should be communicatively connected thereto, wherein the mobile terminal preferably accesses the association information of the digital representation. The association information comprises, in particular, information about which access devices are jointly assigned to a control unit, preferably according to a locking plan and/or building plan. In this way, the associated access devices that are assigned together to a common control unit can be identified on the basis of the association information. According to one embodiment of the present disclosure, the association information comprises identification information for the access devices and control units as well as assignment information from which it can be derived which of the access devices are assigned together to a common control unit and are or should be communicatively connected thereto.

According to one embodiment of the present disclosure, it is provided that the association information is generated as part of a locking plan and/or building plan. In particular, the locking plan and/or building plan comprises information about which types of access devices and/or access components are to be installed at which points in a building and/or area. For example, the locking plan and/or building plan comprises information on which door type is installed at which location, which lock type is installed at which location, which reader is installed at which location, and/or information on whether an access device is a fire protection door, etc.

According to one embodiment of the present disclosure, it is provided that the method comprises:

identifying associated access devices, which are assigned together to a common control unit, based on the association information of the digital representation, optionally displaying the associated access devices on a display device of the mobile terminal, identifying, preferably by means of the mobile terminal, one of the access devices, which is communicatively connected to the common control unit—in particular the control unit that performs step a)—by means of method steps a) to d), in particular method steps a) to e), and concluding that the control unit—in particular the control unit that performs step a)—is communicatively connected to all associated access devices, preferably storing a verification indicator on the mobile terminal and/or on the server for those associated access devices whose associated control unit is identified and/or linking the respective access devices with the associated digital representation. In this way, a particularly advantageous identification of the jointly installed access devices and control units can take place, as a result of which start-up is made easier and errors and incorrect configurations can be avoided.

According to one embodiment of the present disclosure, it is provided that the method comprises:

identifying associated access devices, which are assigned together to a common control unit;

identifying, preferably by means of the mobile terminal, one of the access devices, which is communicatively connected to the common control unit—in particular the control unit that performs step a)—by means of method steps a) to d), in particular method steps a) to e), and concluding that the control unit—in particular the control unit that performs step a)—is communicatively connected to all associated access devices, preferably storing a verification indicator on a mobile terminal and/or on a server for those associated access devices whose associated control unit is identified and/or linking the respective access devices with the associated digital representation.

According to one embodiment of the present disclosure, it is provided that the mobile terminal and/or a server has a digital representation of the access devices, wherein the digital representation comprises configuration data that defines a target mode of operation of the access devices, wherein the method further comprises:

making the configuration data available on an associated control unit in order to enable the control unit to control the access devices that are in communicative connection therewith according to the target mode of operation;

and/or making the configuration data available on an associated control unit and forwarding parts of the configuration data to the access devices in communicative connection with this control unit in order to configure the access devices according to their target mode of operation;

and/or making the configuration data available on an associated control unit and forwarding parts of the configuration data to the access components of the access devices in communicative connection with this control unit in order to configure the access components according to their target mode of operation. As a result, an efficient, automated and error-resistant set-up and configuration of the control unit and/or the access devices can take place according to their planned and intended functions. According to one embodiment, it is possible for the control unit to be configured to control the access devices and/or their access components. A particular advantage results alternatively according to designs of the present disclosure, in which parts of the configuration data are respectively forwarded to the access devices and/or their access components. In these cases, a particularly advantageous level of security can be achieved since the access devices and/or access components receive their respective configuration. As a result, the access devices and/or access components are particularly advantageously not or only partially dependent on control by the control unit during operation. In the event of unauthorized access to the control unit by a third party or by malware and/or in the event of manipulation of the control unit during operation, manipulation of the access devices and/or access components can thus be prevented. This is of particular advantage, for example, for security-relevant aspects of access devices. In this case, for example, an access component designed as a lock device cannot be manipulated by malware or a third party by manipulating the control unit. According to embodiments in which parts of the configuration data are forwarded to the access devices and/or their access components, it is conceivable:

that the corresponding configuration data is deleted from the control unit, or alternatively that the configuration data remains stored on the control unit and, in particular, is not deleted.

According to one embodiment of the present disclosure, it is provided that the digital representation of the access devices is available on the server, wherein the mobile terminal communicates with the server via a direct or indirect network connection and communicates with the control unit the communication interface, wherein the mobile terminal retrieves the configuration data from the server and sends it to the control unit. According to an alternative embodiment of the present disclosure, it is possible that the digital representation of the access devices is available on the server, wherein the control unit communicates with the server via a direct or indirect network connection and retrieves the configuration data from the server. The network connection is particularly preferably implemented using a telecommunications network.

According to one embodiment of the present disclosure, it is provided that the mobile terminal communicates with the control unit via the communication interface and triggers the retrieval of the configuration data. The transmission of the configuration data to the control unit can thus be triggered by the mobile terminal and/or an installer who operates the mobile terminal.

According to one embodiment of the present disclosure, it is provided that the mobile terminal calls up the configuration data in advance from the server, stores it and sends the configuration data to an associated control unit via the communication interface at a later point in time. This advantageously makes it possible for a selectable time interval to lie between the transmission of the configuration data from the server to the mobile terminal and the transmission of the configuration data between the mobile terminal and the control unit. In particular, at least one intermediate storage of the configuration data takes place on the mobile terminal. A particularly flexible configuration process can thereby take place.

According to one embodiment of the present disclosure, it is conceivable that unfinished and/or incomplete configuration data is made available to the control unit before and/or during steps a) to d). The unfinished and/or incomplete configuration data is at least partially transmitted to the control unit, in particular using the mobile terminal and/or the server, before the identification of which access device or which associated access devices the control unit is connected to has been completed. After steps a) to d) or a) to e), i.e., in particular after it has been identified with which access devices the control unit is connected, the mobile terminal and/or the server is then used to reconfigure and/or adapt the unfinished and/or incomplete configuration data, in particular in such a way that the control unit has the final configuration data available that it needs to control the access devices according to their target mode of operation or to forward them to the access devices or their access components. This can save time in a particularly advantageous manner, as a large part of the data transmission, namely the transmission of the unfinished and/or incomplete configuration data to the control unit, can already be carried out in parallel to the steps of identifying the control unit or determining which control unit has been connected to which access devices.

According to one embodiment of the present disclosure, it is provided that an access component of an access device performs the action in step d), wherein the access component is assigned to the associated access device by means of the trigger signal sent in step b) and/or by means of the action performed in step d). This enables an advantageous identification of the access components that are communicatively connected to an access device. It can thus be determined which access components have been installed in an access device. This enables particularly advantageous start-up and configuration. It is conceivable for the server to comprise further information about which access components are or should be jointly assigned to an access device. By retrieving the further association information from the server, in particular using the mobile terminal, the access device that is connected to the access component that performs the action in step d) can be identified. Furthermore, it can be concluded that this access device is connected as a common access device to all access components that are assigned to this access device according to the further association information.

According to a preferred embodiment of the present disclosure, it is conceivable that steps b) to d) or a) to e) are performed for several or all access devices connected to the control unit. It is conceivable that the transmission of a trigger signal from the control unit to the access devices connected to the control unit, in particular according to step b), takes place simultaneously for several or all of the access devices connected to the control unit. It is alternatively conceivable that a trigger signal is sent from the control unit to the access devices connected to the control unit, in particular according to step b), for several or all of the access devices connected to the control unit in each case with a time interval. The access devices each receive the trigger signal sent by the control unit, in particular in accordance with step c), and each perform an action depending on the received trigger signal, in particular in accordance with step d). According to one embodiment, it is conceivable that the trigger signals are each sent to one, several or all access components of the access devices, with one, several or all of the access components performing an action according to step d). It is thus particularly advantageous to check whether all access devices and/or access components that should be connected to the control unit according to the lock plan and/or building plan are actually connected to the control unit. Accordingly, all access devices can be configured with a particularly high level of resilience to errors.

Another subject matter of the present disclosure is an access system with at least one access device and at least one control unit, wherein the at least one access device preferably comprises at least one access component, wherein the access system is configured and designed to perform a method according to an embodiment of the present disclosure. In particular, the access system comprises computer means configured to perform a method according to an embodiment of the present disclosure.

According to one embodiment of the present disclosure, it is provided that a communicative connection is formed between the control unit and an access device associated with the control unit, in particular a wireless and/or wired connection. It is particularly conceivable that a bus system (data bus) is formed between the control unit and one or more access devices associated with the control unit. It is conceivable that the individual access components of an access device each have a wireless and/or wired communicative connection with the access device and/or with the control unit. It is particularly conceivable that the access components are connected to the access device and/or to the control unit via a bus system (data bus). The mobile terminal and/or the control unit can preferably send and/or receive signals and/or continuous signals using wireless communication interfaces.

Another subject matter of the present disclosure is a control unit that can be communicatively connected to at least one access device, and preferably to at least one mobile terminal, and is configured to perform a method according to an embodiment of the present disclosure. In particular, the control unit comprises computer means configured to perform a method according to an embodiment of the present disclosure.

Another subject matter of the present disclosure is an access device that comprises at least one access component, wherein the access device can be communicatively connected to a control unit and is configured to perform a method according to an embodiment of the present disclosure. In particular, the access device comprises computer means configured to perform a method according to an embodiment of the present disclosure.

Another subject matter of the present disclosure is a computer program product comprising instructions that cause an apparatus according to the related claims to perform a method according to an embodiment of the present disclosure.

The features, embodiments and advantages that have been described in connection with one of the subject matters according to the disclosure can each also be used for the other subject matters according to the disclosure. In particular, the features, embodiments and advantages that have already been described in connection with the method according to the disclosure or in connection with an embodiment of the method according to the disclosure can be used for the access system according to the disclosure, the control unit according to the disclosure, the access device according to the disclosure and the computer program product according to the disclosure. The features, embodiments and advantages that have already been described in connection with the access system according to the disclosure or in connection with an embodiment of the access system according to the disclosure can be used for the method according to the disclosure, the control unit according to the disclosure, the access device according to the disclosure and the computer program product according to the disclosure.

BRIEF DESCRIPTION OF THE DRAWINGS

Further advantages and details of the disclosure are to be explained below with reference to the exemplary embodiments illustrated in the drawing. In the drawing.

DETAILED DESCRIPTION OF THE DRAWINGS

Figure 1:
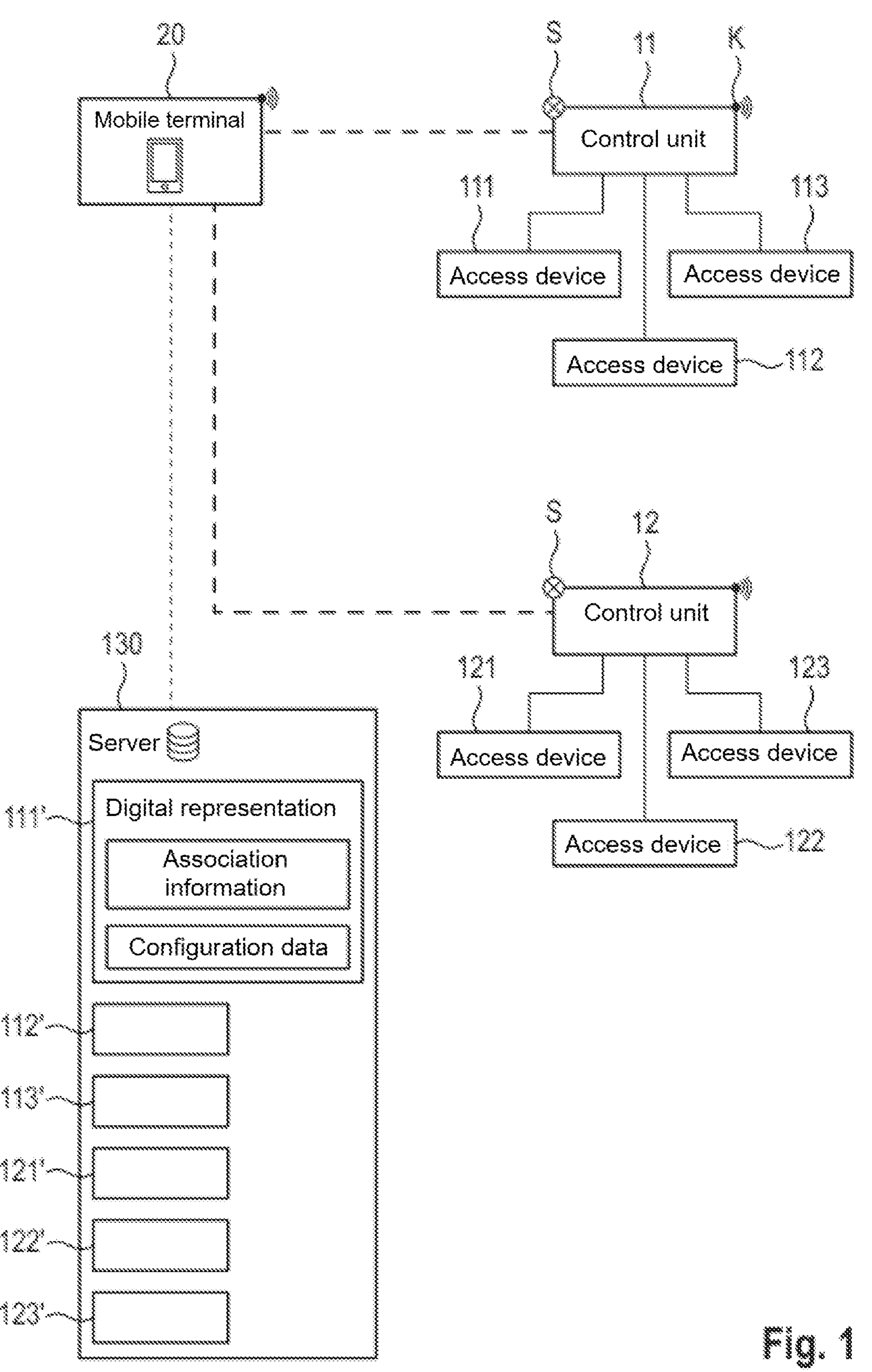
FIG. 1 shows a schematic representation of a mobile terminal and an access system according to a first exemplary embodiment of the present disclosure.

FIG. 1 shows a system according to a first exemplary embodiment of the present disclosure. A control unit 11 is connected to one or more access devices 111, 112, 113. The control unit 11 and the access devices 111, 112, 113 associated with the control unit 11 can communicate via a wireless and/or wired connection. A wired connection, in particular a bus system, is preferably implemented between the control unit 11 and the associated access devices 111, 112, 113. The control unit 11 and the access devices 111, 112, 113 are installed in particular in or on a building and/or area.

It is also possible for a further control unit 12 to be present in or on the building and/or area. The further control unit 12 is connected to one or more further access devices 121, 122, 123. The further control unit 12 and the further access devices 121, 122, 123 associated with the further control unit can communicate via a wireless and/or wired connection, in particular a bus system.

The control unit 11 comprises a communication interface K for information technology communication with a mobile terminal 20 and/or an input device S, via which an installer can make an input. The input device S can be, for example, a touchpad, a number pad or one or more pushbuttons. The information technology signals or continuous signals sent or received via the communication interface K of the control unit 11 are preferably short-range communication signals, particularly preferably Bluetooth signals or continuous Bluetooth signals, low-energy Bluetooth signals, ZigBee signals or Wi-Fi signals. The further control unit 12 also comprise a corresponding communication interface for information technology communication with a mobile terminal 20 and/or an input device.

The mobile terminal 20 can be, for example, a portable cell phone or a portable computer device. The mobile terminal 20 is preferably carried by an installer.

The mobile terminal 20 is also configured to communicate with a server 130, in particular using a wireless communication link. It is preferably conceivable for the mobile terminal 20 to communicate with the server 130 via a corresponding interface of the mobile terminal 20 and with the aid of a telecommunications network. The server 130 comprises a storage device in which digital representations 111', 112', 113', 121', 122', 123', in particular digital twins, of the access devices 111, 112, 113, 121, 122, 123 are stored. The digital representations 111', 112', 113', 121', 122', 123' comprise association information and preferably configuration data. From the association information for the access devices 111, 112, 113, 121, 122, 123 it can be derived which of the access devices 111, 112, 113, 121, 122, 123 are assigned together to a common control unit 11, 12 and are or should be communicatively connected thereto. Such association information is generated, for example, during the planning phase of the building or the planning phase of the technical building equipment (TBE). The associated access devices 111, 112, 113, for example, which are assigned to the common control unit 11, can thus be identified on the basis of the association information. The mobile terminal 20 can access the association information via its communication link to the server 130.

The configuration data of the digital representations 111', 112', 113', 121', 122', 123' is provided to configure a target mode of operation, i.e., in particular a planned and/or provided function, for the corresponding access devices 111, 112, 113, 121, 122, 123. The configuration data can be transmitted from the server 130 to the mobile terminal 20 and from the mobile terminal 20 to the control units 11, 12.

Figure 2:
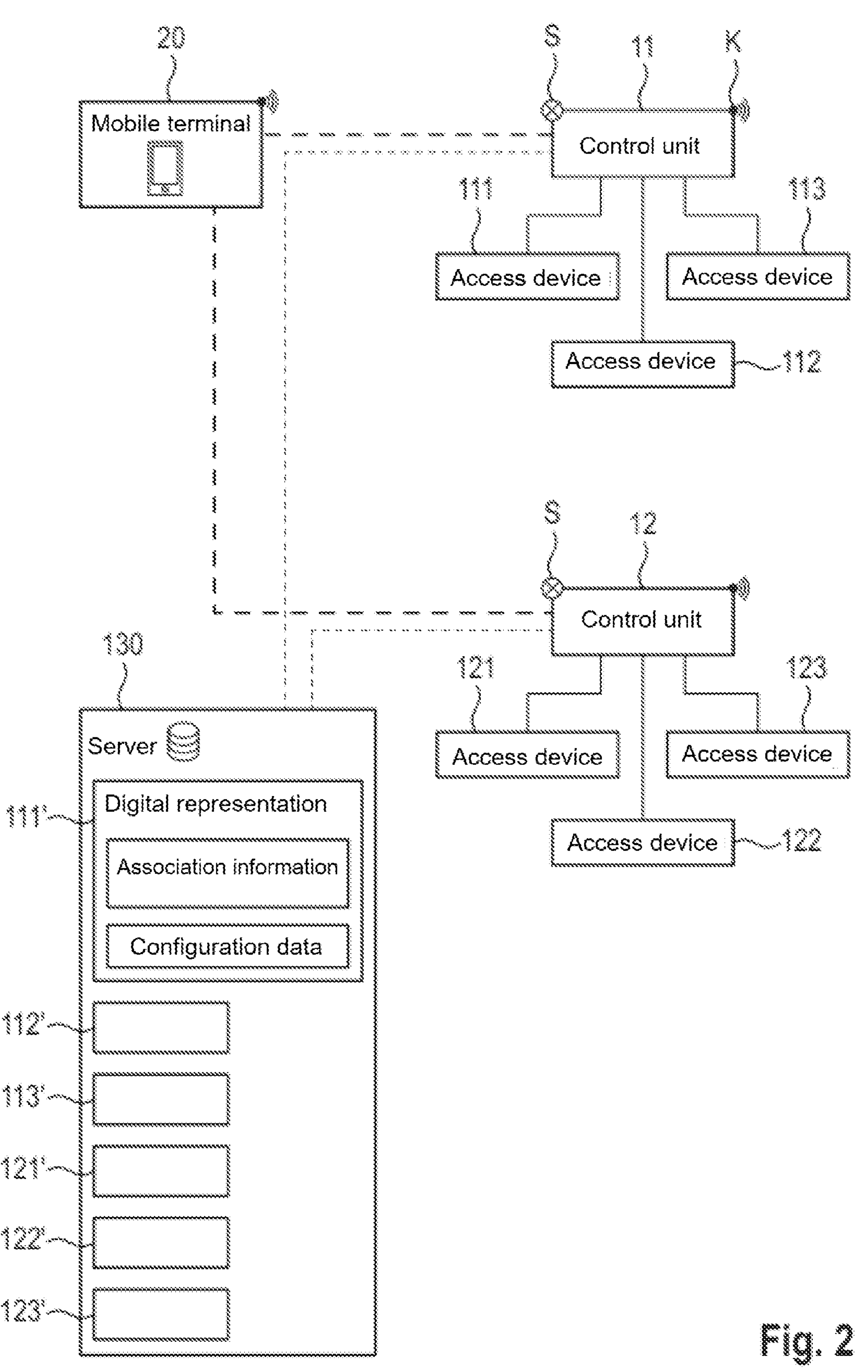
FIG. 2 shows a schematic representation of a mobile terminal and an access system according to a second exemplary embodiment of the present disclosure.

FIG. 2 shows a system according to a second exemplary embodiment of the present disclosure. The second exemplary embodiment is similar to the first exemplary embodiment, with the difference that the control units 11, 12 themselves have a communicative connection to the server 130, for example using a telecommunications network. It is thus conceivable that the association information and configuration data can be transmitted from the server 130 to the control unit 11, 12. The retrieval of association information and configuration data from the server system 130 using the mobile terminal 20 can accordingly take place and/or be triggered via an indirect network connection, in particular via the control unit 11, 12.

Figure 3:
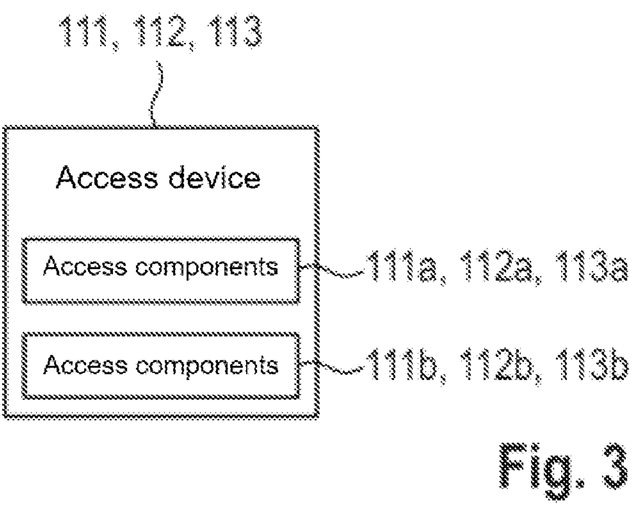
FIG. 3 shows a schematic representation of an access device according to an embodiment of the present disclosure.

FIG. 3 shows an access device 111, 112, 113 according to an embodiment of the present disclosure. The access device 111, 112, 113 can, for example, comprise a door and/or separating device that is arranged at an entrance and/or exit of a building, part of a building, a room and/or an area. The access device 111, 112, 113 has one or more access components 111*a*, 112*a*, 113*a*, 111*b*, 112*b*, 113*b* or is connected thereto. The access components 111*a*, 112*a*, 113*a*, 111*b*, 112*b*, 113*b* can take on a variety of functions. For example, one, several or all of the following access components 111*a*, 112*a*, 113*a*, 111*b*, 112*b*, 113*b* can be provided on an access device 111, 112, 113:

- a door element and/or a separating element,
- a hinge,
- a fire protection element,
- a lock, in particular an electric lock,
- an opening and/or closing device for a door element, in particular comprising an actuator and/or motor,
- a person control and/or identity control unit, in particular a reader for a passport,
- an access control unit, in particular a code or password control,
- a biometric sensor,
- an optical sensor,
- an acoustic sensor,
- an electrical power and/or voltage supply,
- a display device,
- a light source,
- an acoustic output device,
- a warning and/or safety device According to one embodiment, it is possible for the access device 111, 112, 113 to comprise a signal output device for transmitting a signal that can be perceived by an installer. In particular, this can be an optical or acoustic signal output device. Alternatively or additionally, it is possible for the access device 111, 112, 113 to have a communication interface for transmitting an information technology signal or for changing an existing information technology continuous signal. The access device 111, 112, 113 can preferably also receive information technology signals via the communication interface. The information technology signals or continuous signals sent or received via the communication interface K of the access device 111, 112, 113 are preferably short-range communication signals, particularly preferably Bluetooth signals or continuous Bluetooth signals, low-energy Bluetooth signals, ZigBee signals or Wi-Fi signals.

Figure 4:
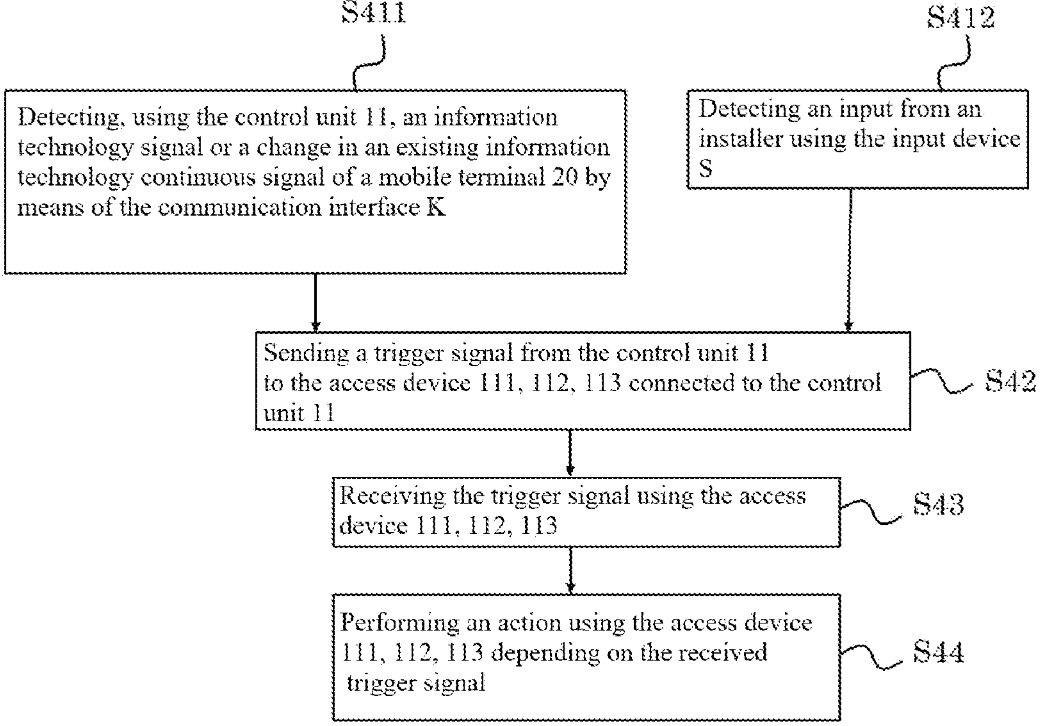
FIG. 4 shows a schematic representation of a method according to an embodiment of the present disclosure.

FIG. 4 shows a schematic representation of a method according to an embodiment of the present disclosure. In a step S411 the control unit 11 is used to detect an information technology signal or a change in an existing information technology continuous signal of a mobile terminal 20 by means of the communication interface K. Alternatively or additionally to step S411, a step S412 is performed. In step S412, an input from an installer is made at an input device S of the control unit-11 and detected using the input device S. In a step S42, a trigger signal is sent from control unit 11 to an access device 111, 112, 113 connected to the control unit 11. The trigger signal is sent by the control unit 11 in particular in response to the detection in step S411 and/or step S412. In the step S43, the trigger signal is received using the access device 111, 112, 113. In the step S44, an action is performed by the access device 111, 112, 113 as a function of the trigger signal received. The action in the step S44 is performed in particular in response to the trigger signal received in the step S43. The action performed in the step S44 can be used to identify which access device 111, 112, 113 is connected to the control unit 11, with the aid of which steps S411 and/or S412 were performed. An advantageous and efficient start-up can thus take place.

Figure 5:
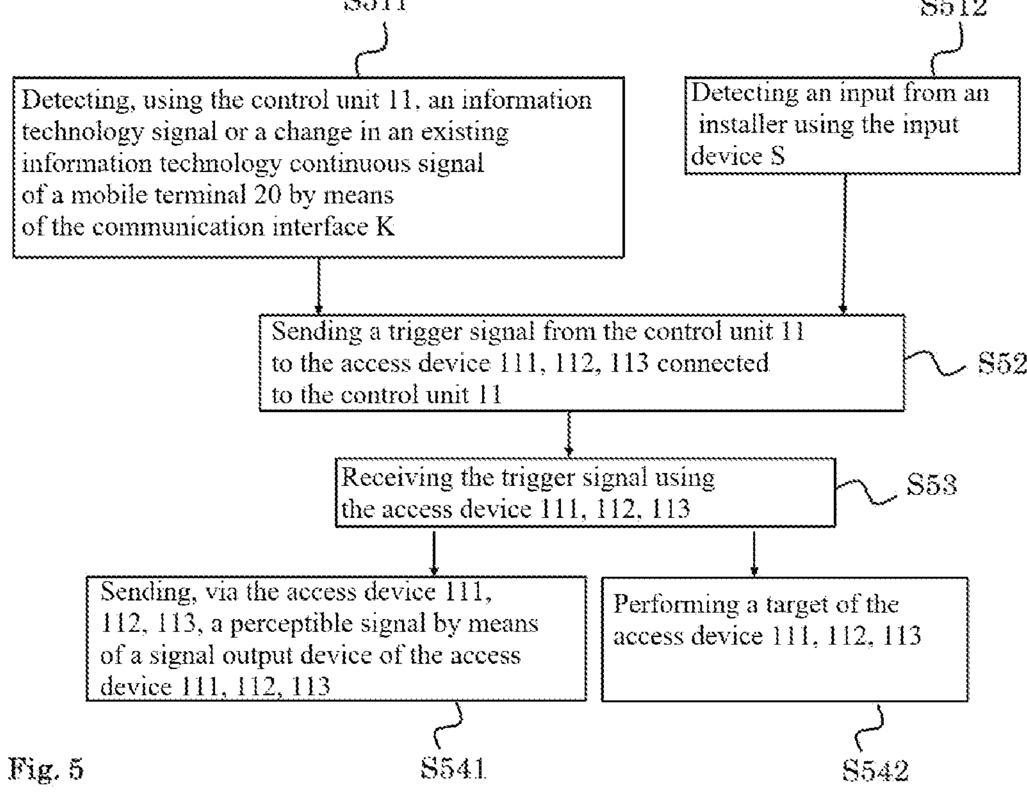
FIG. 5 shows a schematic representation of a method according to an embodiment of the present disclosure.

FIG. 5 shows a schematic representation of a method according to an embodiment of the present disclosure. In a step S511 the control unit 11 is used to detect an information technology signal or a change in an existing information technology continuous signal of a mobile terminal 20 by means of the communication interface K. Alternatively or additionally to step S511, a step S512 is performed. In step S512, an input from an installer is made at an input device S of the control unit 11 and detected using the input device S. In a step S52, a trigger signal is sent from control unit 11 to an access device 111, 112, 113 connected to the control unit 11. The trigger signal is sent by the control unit 11 in particular in response to the detection in step S511 and/or step S512. In the step S53, the trigger signal is received using the access device 111, 112, 113.

In the step S541, the access device 111, 112, 113 sends a perceptible signal by means of a signal output device of the access device 111, 112, 113. Specifically, the perceptible signal is sent in step S541 in response to the trigger signal received in step S53. The perceptible signal in step S541 is, for example, an acoustic or optical signal that can be perceived by an installer in the vicinity of the access device Using the perceptible signal sent, the installer can identify the access device 111, 112, 113 that transmitted the perceptible signal.

Step S542 takes place as an alternative additionally to step S541. In the step S542, a target function of the access device 111, 112, 113, in particular one of the access components of the access device 111, 112, 113, is performed. Specifically, the target function in step S542 is performed in response to the trigger signal received in step S53. The target function is in particular a target function that can be perceived by the installer. The installer can use the performed target function to identify the access device 111, 112, 113 or the access component that performed the target function.

In a particularly advantageous manner, it is possible for the installer to make an input in the mobile terminal 20, wherein the input comprises information about which access-device 111, 112, 113 performed the desired function in step S542 and/or which access device 111, 112, 113 sent the perceptible signal in step S541. The identity of the access device 111, 112, 113 can thus be determined and/or stored. It is determined in such a way that this access device 111, 112, 113 is connected to the control unit 11, with the aid of which step S511 and/or step S512 was performed. Accordingly, the input of the installer in the mobile terminal 20 can comprise information about which control unit 11 detected the information technology signal or the change in an existing continuous information technology signal in step S511 and/or on the input device S from which control unit 11 the input was made in step S512 performed by the installer.

Figure 6:
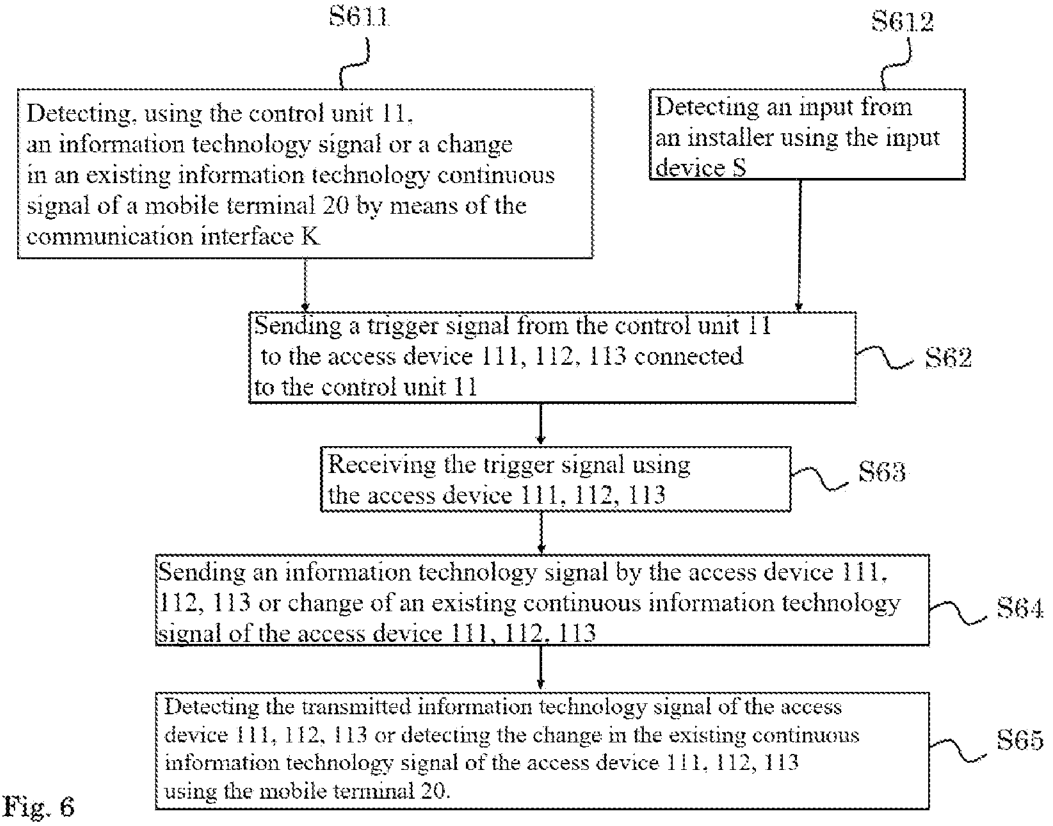
FIG. 6 shows a schematic representation of a method according to an embodiment of the present disclosure.

FIG. 6 shows a schematic representation of a method according to an embodiment of the present disclosure. In a step S611 the control unit 11 is used to detect an information technology signal or a change in an existing information technology continuous signal of a mobile terminal 20 by means of the communication interface K. Alternatively or additionally to step S611, a step S612 is performed. In step S612, an input from an installer is made at an input device S of the control unit 11 and detected using the input device S. In a step S62, a trigger signal is sent from control unit 11 to an access device 111, 112, 113 connected to the control unit 11. The trigger signal is sent by the control unit 11 in particular in response to the detection in step S611 and/or step S612. In the step S63, the trigger signal is received using the access device 111, 112, 113. In the step S64, an information technology signal is sent by the access device 111, 112, 113 or an existing continuous information technology signal of the access device 111, 112, 113 is changed. The access device 111, 112, 113 comprises a corresponding communication interface for transmitting the information technology signal or continuous signal. The transmission of the information technology signal or the changing of an existing continuous information technology signal in step S64 takes place in particular as a function of the trigger signal received in step S63. In step S65, the transmitted information technology signal of the access device 111, 112, 113 is detected or the change in the existing continuous information technology signal of the access device 111, 112, 113 is detected by the mobile terminal 20. In particular, identification information of the access device 111, 112, 113, which has performed step S64, can be derived from the detected information technology signal or the detected change in the existing continuous information technology signal. The identity of the access device 111, 112, 113 can thus be ascertained.

Figure 7:
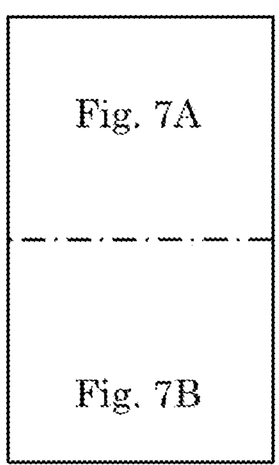
FIG. 7 shows a schematic representation of a method according to an embodiment of the present disclosure, wherein FIG. 7 comprises the two partial FIGS. 7*a* and 7*b*.
Figure 7A:
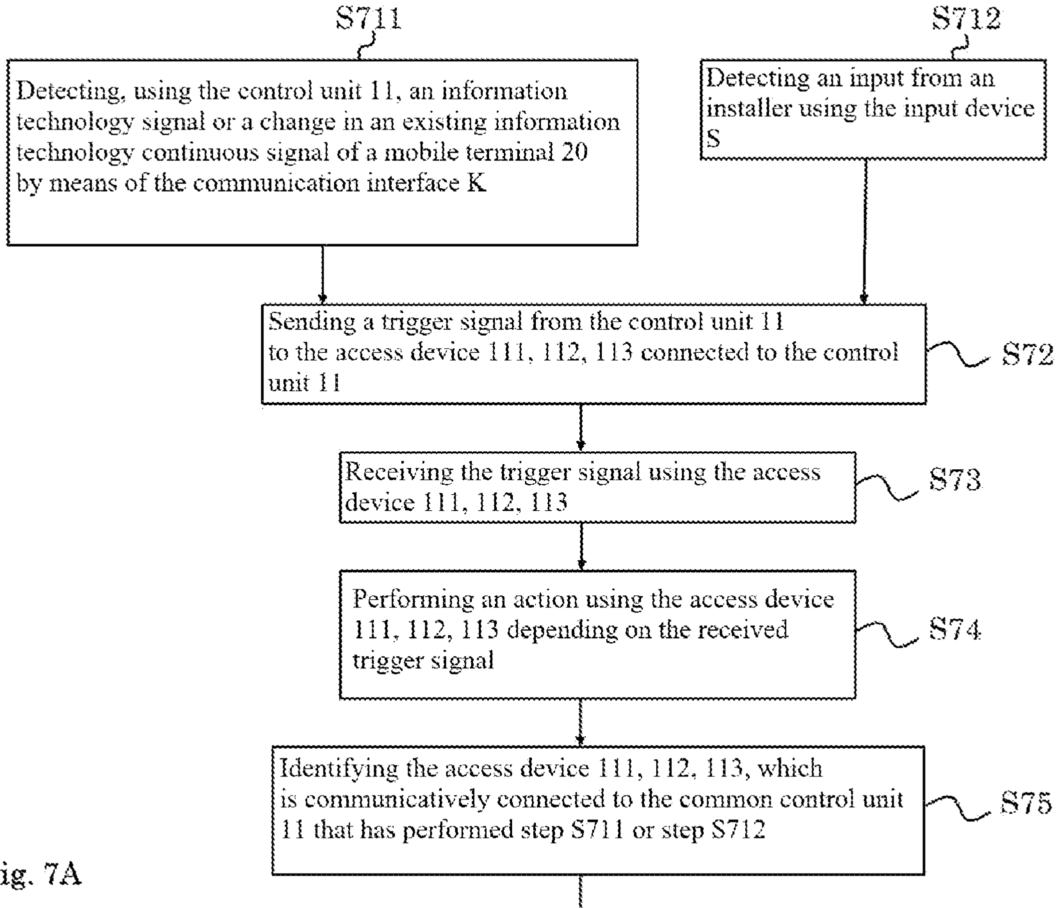
Figure 7B:
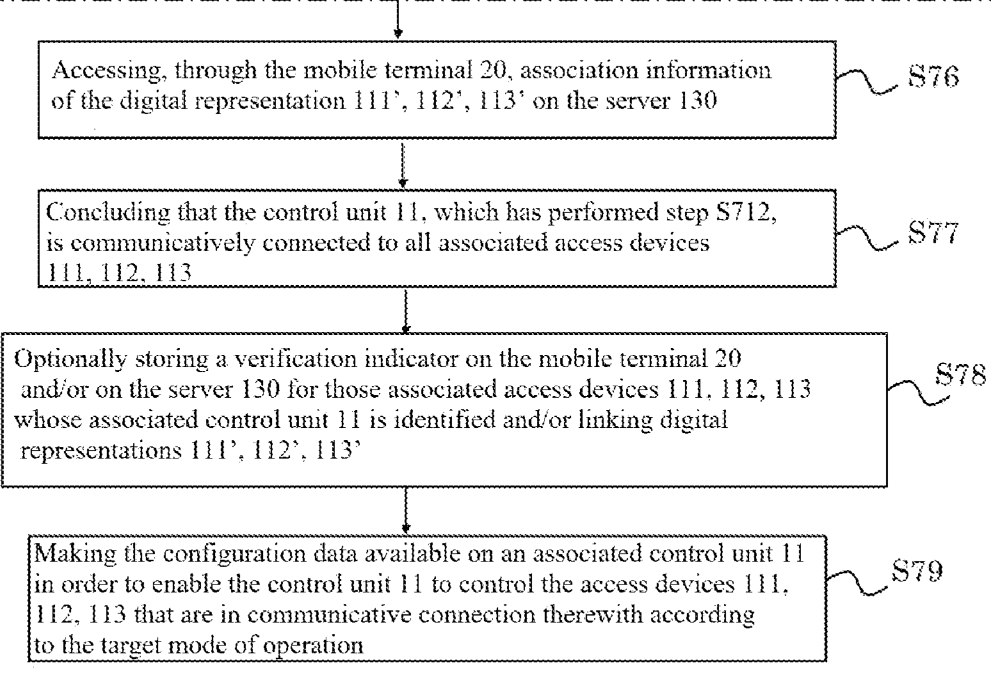

FIG. 7 shows a method for preparing for the start-up of a control unit 11 for access devices 111, 112, 113 according to an embodiment of the present disclosure. FIG. 7 consists of the partial FIGS. 7*a* and 7*b*, wherein FIG. 7*b* is a continuation of FIG. 7*a*. In a step S711 the control unit 11 is used to detect an information technology signal or a change in an existing information technology continuous signal of a mobile terminal 20 by means of the communication interface K. Alternatively or additionally to step S711, a step S712 is performed. In step S712, an input from an installer is made at an input device S of the control unit 11 and detected using the input device S. In a step S72, a trigger signal is sent from control unit 11 to an access device 111, 112, 113 connected to the control unit 11. The trigger signal is sent by the control unit 11 in particular in response to the detection in step S711 and/or step S712. In the step S73, the trigger signal is received using the access device 111, 112, 113. In the step S74, an action is performed by the access device 111, 112, 113 as a function of the trigger signal received. The action in the step S74 is performed in particular in response to the trigger signal received in the step S73. In step S75, the access device 111, 112, 113, which is communicatively connected to the common control unit 11 that has performed step S711 or step S712, is identified. In particular, it is identified which access device performed the action in step S74. The identity of the control unit 11 that has performed step S711 or step S712 is also known, e.g., in that the installer identifies at which control unit 11 the input in step S712 was made, or in that an identity of the control unit 11 can be derived from a communication between the mobile terminal 20 and the control device in step S711. In step S76, the mobile terminal 20 accesses association information of the digital representation 111', 112', 113' on the server 130. In step S77, it is concluded that control unit 11, which has performed step S711 or step S712, is communicatively connected to all associated access devices 111, 112, 113. This conclusion is drawn in particular on the basis of the association information, from which it can be derived which associated access devices 111, 112, 113 are or should be connected to the common control unit 11. In an optional step S78, a verification indicator is optionally stored on the mobile terminal 20 and/or on the server 130 for those associated access devices 111, 112, 113 whose associated control unit 11 is identified, and/or optionally the respective access devices 111, 112, 113 are linked with the associated digital representation 111', 112', 113'.

In step S79, configuration data is made available on the associated control unit 11 in order to enable the control unit 11 to control the access devices 111, 112, 113 that are in communicative connection therewith according to the target mode of operation. Thus, an advantageous start-up of the control unit 11 and the access devices 111, 112, 113 can take place.

Alternatively to step S79, it is conceivable for the configuration data to be made available on an associated control unit 11 and parts of the configuration data to be forwarded to the access devices 111, 112, 113 that are in communicative connection with this control unit 11 in order to configure the access devices 111, 112, 113 according to their target mode of operation. In this case, the configuration data can subsequently be deleted from the control unit 11 or remain stored on the control unit. This offers particularly advantageous security, since the functions of the access devices 111, 112, 113, for example security functions, cannot be manipulated by subsequent manipulation of the control unit 11.

Furthermore, as an alternative to step S79, it is conceivable for the configuration data to be made available on an associated control unit 11 and forwarding parts of the configuration data to the access components of the access devices 111, 112, 113 in communicative connection with this control unit 11 in order to configure the access components according to their target mode of operation. In this case, the configuration data can subsequently be deleted from the control unit 11 or remain stored on the control unit 11. This offers particularly advantageous security, since the functions of the access components, for example security functions, cannot be manipulated by subsequent manipulation of the control unit 11.

The steps listed in the figures are not necessarily in sequential or chronological order. The order of the steps may, in many cases, be changed from the order presented in the figures in accordance with alternative embodiments of the present disclosure:

The invention claimed is:

1. A method for preparing for the start-up of a control unit for access devices, wherein at least one access device is communicatively connected to the control unit, wherein the control unit has a communication interface for information technology communication with a mobile terminal and/or has an input device for detecting an input from an installer or is in communicative connection with an input device for detecting an input from an installer, wherein the method includes the following steps in the following order:

a) a first step of detecting, using the control unit, an information technology signal or a change in an existing information technology continuous signal of a mobile terminal by the communication interface, and/or detecting an input from an installer using the input device, b) a second step of sending a trigger signal from the control unit to the access device connected to the control unit, c) a third step of receiving the trigger signal using the access device, and d) a fourth step of performing an action using the access device depending on the received trigger signal, wherein the action performed in step d) is an action perceptible to an installer, identifying associated access devices, which are assigned together to a common control unit, identifying using the mobile terminal, one of the access devices, which is communicatively connected to the common control unit by method steps a) to d), and concluding that the control unit is communicatively connected to all associated access devices, wherein the mobile terminal communicates with a server via a direct or indirect network connection, wherein the server has a digital representation of the access devices, wherein the digital representation comprises association information from which it can be derived which of the access devices are assigned together to a common control unit and are or should be communicatively connected thereto, wherein the mobile terminal accesses the association information of the digital representation, wherein the method further includes the following steps:

identifying associated access devices, which are assigned together to a common control unit, based on the association information of the digital representation, displaying the associated access devices on a display device of the mobile terminal, identifying one of the access devices, which is communicatively connected to the common control unit—the control unit that performs step a)—by method steps a) to d), and concluding that the control unit that performs step a)—is communicatively connected to all associated access devices, storing a verification indicator on the mobile terminal and/or on the server for those associated access devices whose associated control unit is identified and/or linking the respective access devices the associated digital representation.

2. The method according to claim 1, wherein the installer makes an input into the mobile terminal, wherein the input comprises information about which control unit detects or has detected an information technology signal or a change in an existing continuous information technology signal in step a) or at the input device from which control device an input is performed or has been performed in step a) by the installer, and/or which access device is performing or has performed the action in step d).

3. The method according to claim 1, wherein the action performed by the access device in step d) is a target function of the access device and/or a target function of an access component of the access device.

4. The method according to claim 1, wherein the action performed by the access device in step d) comprises emitting a perceptible signal by the access device by a signal output device of the access device.

5. The method according to claim 1, wherein the action performed by the access device in step d) comprises transmitting an information technology signal from the access device or modifying an existing permanent information technology signal of the access device.

6. The method according to claim 5, wherein the method includes the following step:

e) detecting the transmitted information technology signal of the access device or detecting the change in the existing continuous information technology signal of the access device using the mobile terminal.

7. The method according to claim 6, wherein, depending on the signal detected in step e) or the change in the existing continuous signal detected in step e), information is obtained or derived about which access device transmitted the information technology signal in step d) or the continuous information technology signal of which access device was changed in step e).

8. The method according to claim 1, wherein the method includes the following step:

storing a verification indicator on a mobile terminal and/or on a server for those associated access devices whose associated control unit is identified and/or linking the respective access devices with the associated digital representation.

9. The method according to claim 1, wherein the mobile terminal and/or a server has a digital representation of the access devices, wherein the digital representation comprises configuration data that defines a target mode of operation of the access devices, wherein the method further comprises:

making the configuration data available on an associated control unit in order to enable the control unit to control the access devices that are in communicative connection therewith according to the target mode of operation;

and/or making the configuration data available on an associated control unit and forwarding parts of the configuration data to the access devices in communicative connection with this control unit in order to configure the access devices according to their target mode of operation;

and/or making the configuration data available on an associated control unit and forwarding parts of the configuration data to the access components of the access devices that are in communicative connection with this control unit in order to configure the access components according to their target mode of operation.

10. The method according to claim 1, wherein an access component of an access device performs the action in step d), wherein the access component is assigned to the associated access device by the trigger signal sent in step b) and/or by the action performed in step d).

11. An access system with at least one access device and at least one control unit, wherein the at least one access device comprises at least one access component, wherein the access system is configured and designed to perform the method according to claim 1.

12. A control unit configured to be communicatively connected to at least one access device, and is configured to perform the method according to claim 1.

13. A non-transitory computer readable medium comprising a computer program product, the computer product comprising instructions that cause an apparatus according to claim 11 to perform a method for preparing for the start-up of a control unit for access devices, wherein at least one access device is communicatively connected to the control unit, wherein the control unit:

has a communication interface for information technology communication with a mobile terminal and/or has an input device for detecting an input from an installer or is in communicative connection with an input device for detecting an input from an installer, wherein the method includes the following steps in the following order:

a) a first step of detecting, using the control unit, an information technology signal or a change in an existing information technology continuous signal of a mobile terminal by the communication interface, and/or detecting an input from an installer using the input device, b) a second step of sending a trigger signal from the control unit to the access device connected to the control unit, c) a third step of receiving the trigger signal using the access device, and d) a fourth step of performing an action using the access device depending on the received trigger signal, wherein the action performed in step d) is an action perceptible to an installer, identifying associated access devices, which are assigned together to a common control unit, identifying one of the access devices, which is communicatively connected to the common control unit by method steps a) to d), and concluding that the control unit is communicatively connected to all associated access devices, wherein the mobile terminal communicates with a server via a direct or indirect network connection, wherein the server has a digital representation of the access devices, wherein the digital representation comprises association information from which it can be derived which of the access devices are assigned together to a common control unit and are or should be communicatively connected thereto, wherein the mobile terminal accesses the association information of the digital representation, wherein the method further includes the following steps:

identifying associated access devices, which are assigned together to a common control unit, based on the association information of the digital representation, displaying the associated access devices on a display device of the mobile terminal, identifying one of the access devices, which is communicatively connected to the common control unit—the control unit that performs step a)—by method steps a) to d), and concluding that the control unit that performs step a)—is communicatively connected to all associated access devices, storing a verification indicator on the mobile terminal and/or on the server for those associated access devices whose associated control unit is identified and/or linking the respective access devices the associated digital representation.

* * * * *